US009872582B2

(12) United States Patent
Song et al.

(10) Patent No.: US 9,872,582 B2
(45) Date of Patent: Jan. 23, 2018

(54) ELECTRIC PRESSURE COOKER

(71) Applicants: MIDEA GROUP CO., LTD., Foshan (CN); GUANGDONG MIDEA CONSUMER ELECTRICS MANUFACTURING CO., LTD., Foshan (CN)

(72) Inventors: Yanping Song, Foshan (CN); Ruide Chen, Foshan (CN); Xiaolin Zhang, Foshan (CN)

(73) Assignees: Midea Group Co., Ltd., Foshan, Guangdong (CN); Guangdong Midea Consumer Electrics Manufacturing Co., Ltd., Foshan, Guangdong (CN)

( * ) Notice: Subject to any disclaimer, the term of this patent is extended or adjusted under 35 U.S.C. 154(b) by 54 days.

(21) Appl. No.: 14/764,848

(22) PCT Filed: Jul. 28, 2014

(86) PCT No.: PCT/CN2014/083151
§ 371 (c)(1),
(2) Date: Jul. 30, 2015

(87) PCT Pub. No.: WO2015/010660
PCT Pub. Date: Jan. 29, 2015

(65) Prior Publication Data
US 2016/0135636 A1    May 19, 2016

(30) Foreign Application Priority Data

Jul. 26, 2013  (CN) ..................... 2013 2 0452818 U
Jul. 26, 2013  (CN) ..................... 2013 2 0453572 U

(51) Int. Cl.
*F27D 11/00*    (2006.01)
*A47J 27/08*    (2006.01)
(Continued)

(52) U.S. Cl.
CPC ........... *A47J 27/0802* (2013.01); *A47J 27/08* (2013.01); *A47J 27/086* (2013.01); *A47J 36/06* (2013.01)

(58) Field of Classification Search
CPC ...... A47J 27/0802; A47J 27/08; A47J 27/086; A47J 36/06; A47J 27/0817; A47J 27/09
See application file for complete search history.

(56) References Cited

U.S. PATENT DOCUMENTS

2008/0142498 A1    6/2008   He et al.
2011/0095015 A1    4/2011   Kao

FOREIGN PATENT DOCUMENTS

CN    201312729    *   9/2009
CN    201312729 Y       9/2009
(Continued)

OTHER PUBLICATIONS

PCT/CN2014/083151 International Search Report & Written Opinion dated Nov. 19, 2014, 12 pages.
(Continued)

*Primary Examiner* — Shawntina Fuqua
(74) *Attorney, Agent, or Firm* — Lathrop Gage LLP

(57) ABSTRACT

An electric pressure cooker is provided, including a cooker body (1); a cooker cover (2) having a closing state and an opening state, wherein the cooker cover (2) is rotatable with respect to the cooker body (1) between a sealing position and an unsealing position in the closing state; a micro-switch assembly (3) disposed on the cooker body (1) and adapted to switch between an OFF state in which the micro-switch assembly (3) electrically disconnects the electric pressure cooker from an external power source and an ON state in which the micro-switch assembly (3) electrically connects the electric pressure cooker with the external power source, wherein the micro-switch assembly (3) is in the ON state
(Continued)

when the cooker cover (2) is in the opening state or at the sealing position.

15 Claims, 9 Drawing Sheets

(51) Int. Cl.
    *A47J 36/06* (2006.01)
    *A47J 27/086* (2006.01)

(56) References Cited

FOREIGN PATENT DOCUMENTS

| CN | 201870436 | * | 6/2011 |
| CN | 201870436 U | | 6/2011 |
| CN | 203406211 U | | 1/2014 |
| CN | 203447077 U | | 2/2014 |
| EP | 3015033 A1 | | 5/2016 |
| WO | 20000/044096 A2 | | 7/2000 |

OTHER PUBLICATIONS

European Patent Application No. 14830056.9 Extended European Search Report dated Mar. 20, 2017, 9 pages.
Russian Patent Application No. 20151317081 (corresponding to PCT/CN2014/083151) Office Communication dated Jun. 7, 2017, 6 pages.

* cited by examiner

70

ELECTRIC PRESSURE COOKER

CROSS REFERENCE TO RELATED APPLICATIONS

This U.S. application claims priority under 35 U.S.C. 371 to, and is a National Phase application of, International Patent Application No. PCT/CN2014/083151, filed Jul. 28, 2014 which claims the benefit of prior Chinese Patent Applications No. 201320453572.6 and No. 201320452818.8, filed Jul. 26, 2013. The entire contents of the before-mentioned patent applications are incorporated by reference as part of the disclosure of this U.S. application

FIELD

Embodiments of the present invention generally relate to a household electrical appliance field, and more particularly, to an electric pressure cooker.

BACKGROUND

Electric pressure cookers in the related art do not have the function of cooking food with the cover open, thus resulting in inconvenience and poor practicability. Moreover, the micro-switch assembly of the conventional electric pressure cooker has a straight push rod, so the water on the cap can flow into the micro-switch assembly along the straight push rod, thus affecting a proper operation of the micro-switch assembly. Therefore, the practicability and stability in use of the micro-switch assembly of the conventional electric pressure cooker cannot be ensured.

SUMMARY

Embodiments of the present invention seek to solve at least one of the problems existing in the related art to at least some extent. Accordingly, an object of the present invention is to provide an electric pressure cooker which can be operated to cook as the cover thereof being in the opening state.

Embodiments of the present invention provide an electric pressure cooker, including: a cooker body; a cooker cover having a closing state in which the cooker body is covered by the cooker cover and an opening state in which the cooker cover is removed from the cooker body, wherein the cooker cover is rotatable with respect to the cooker body between a sealing position and an unsealing position in the closing state; a micro-switch assembly disposed on the cooker body and adapted to switch between an OFF state in which the micro-switch assembly controls the electric pressure cooker not to cook and an ON state in which the micro-switch assembly controls the electric pressure cooker to cook, wherein when the cooker cover is in the closing state and at the unsealing position, the cooker cover actuates the micro-switch assembly to switch to the OFF state, and wherein the micro-switch assembly is in the ON state when the cooker cover is in the opening state or at the sealing position.

With the micro-switch assembly, the electric pressure cooker according to embodiments of the present invention can be operated to cook without being covered by the cooker cover, thus expending the applications of the electric pressure cooker greatly.

In addition, the electric pressure cooker according to embodiments of the present invention further includes following features.

In some embodiments, the cooker body includes: a housing; an outer container disposed in the housing such that a cavity is defined between the outer container and the housing; and a cap fitted over upper portions of the outer container and the housing and closing the cavity, wherein the micro-switch assembly is disposed in the cavity and the push rod extended upwardly out of the cover.

In some embodiments, a boss is disposed on a bottom surface of the cooker cover and is adapted to actuate the push rod to move.

In some embodiments, the micro-switch assembly has a first mounting hole, and the cap has a threaded stud disposed on a bottom surface of the cap and extended downwardly through the first mounting hole, wherein the micro-switch assembly is secured to the threaded stud via a fastener fitted with the threaded stud.

In some embodiments, the micro-switch further includes: a front housing having a second mounting hole within which the push rod is movably disposed in the up-down direction; a rear housing coupled with the front housing; a fixed support disposed on the front housing; a movable support movably coupled with the fixed support in the up-down direction; a fixed piece disposed on the front housing and has a first contactor; a movable piece defining a first end and a second end, the first end being connected with the movable support so that the movable piece is movable between a contacting position and a separating position in the up-down direction along with the movable support, and the second end being extended through the fixed support to a position bellow the fixed piece and has a second contactor, wherein the first contactor is contacted with the second contactor in the contacting position, and the first contactor is separated from the second contactor in the separating position; and an elastic member disposed between push rod and the movable support and configured to apply an upward force on the push rod when the push rod moves downwardly.

In some embodiments, the push rod is configured as a column and has a water blocking flange disposed on a peripheral surface of the push rod, an orthogonal projection area of the water blocking flange on the front housing is larger than a cross-sectional area of the second mounting hole.

In some embodiments, the water blocking flange is configured as a square plate.

In some embodiments, the micro-switch assembly further comprises: a silicone sleeve fitted over the push rod and located between the water blocking flange and the second mounting hole, and the silicone sleeve has a lower end pressed against an upper surface of the front housing.

In some embodiments, the push rod is non-straight.

In some embodiments, the push rod includes: a pushing part fitted within the second mounting hole; a water guiding part; a connecting part defining a first end connected with the pushing part and a second end connected with the water guiding part, and an upper surface of the connecting part is extended horizontally or extended obliquely and downwardly in a direction from the second end of the connecting part to the first end of the connecting part.

In some embodiments, the connecting part is straight and is substantially perpendicular to the pushing part and the water guiding part respectively.

In some embodiments, the second end of the connecting part is connected with a lower end of the water guiding part and the first end of the connecting part is connected with an upper end of the pushing part.

In some embodiments, the connecting part comprises an arc segment and a straight segment, and the pushing part has a L-shape, the arc segment is connected with the water guiding part and the straight segment is connected with the pushing part.

In some embodiments, an upper end of the water guiding part is higher than the upper end of the pushing part, and the lower end of the water guiding part is flush with a lower end of the pushing part.

In some embodiments, the first end of the connecting part is higher than the second end of the connecting part.

In some embodiments, the pushing part, the connecting part and the water guiding part are integrally formed.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

REFERENCE NUMERALS

Figure 1:
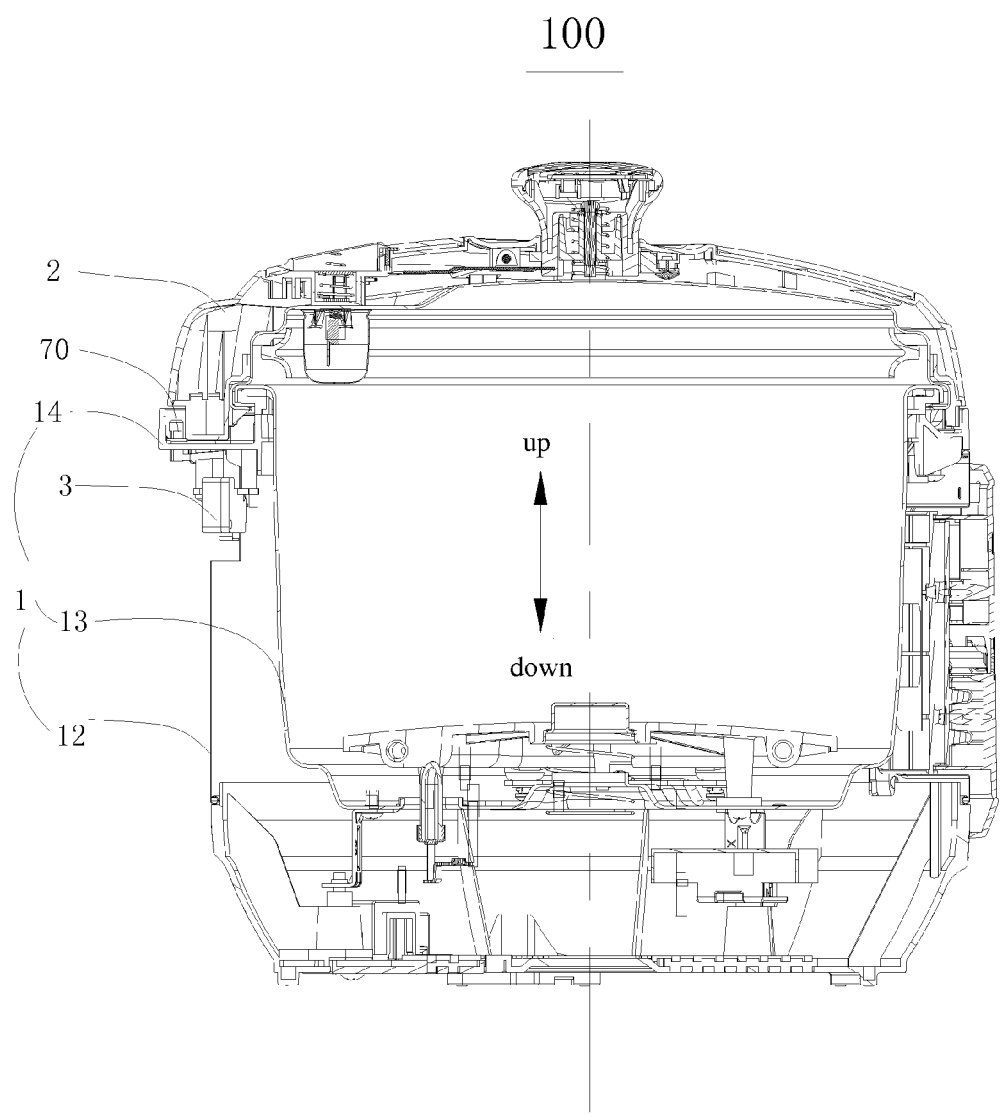
FIG. 1 is a sectional view of an electric pressure cooker according to an embodiment of the present invention.

100: electric pressure cooker
1: cooker body; 12: housing; 13: outer container; 14: cap; 141: threaded stud; 142: fastener;
143: through-hole;
2: cooker cover; 21: boss;
3: micro-switch assembly; 31: first mounting hole;
10: front housing; 11: second mounting hole;
20: rear housing;
30: fixed support;
40: movable support;
50: fixed piece; 51: first contactor;
60: movable piece; 61: first end; 62: second end; 63: second contactor;
70: push rod; 71: pushing part; 711: low end of the pushing part; 72 (72a): connecting part; 721 (721a): first end; 722 (722a): second end; 73: water guiding part; 74: water blocking flange; 75: silicone sleeve;
80: elastic member;
90: spring piece.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

An electric pressure cooker 100 according to embodiments of the present invention will be described in the following with reference to FIGS. 1 to 13.

Figure 2:
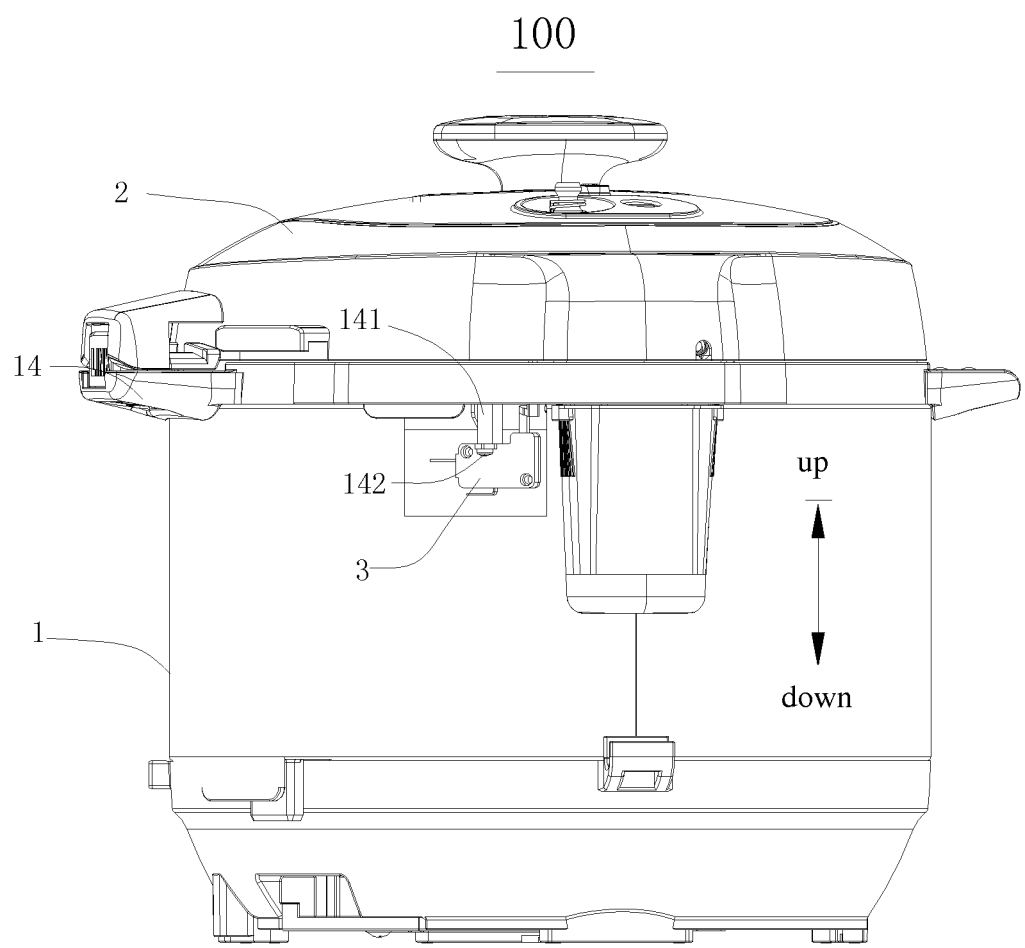
FIG. 2 is a schematic view of an electric pressure cooker according to an embodiment of the present invention.
Figure 3:
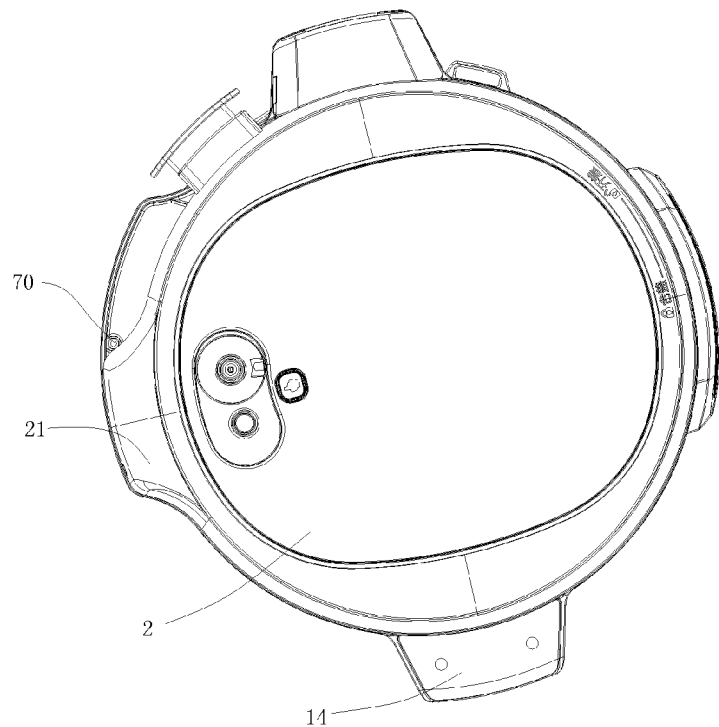
FIG. 3 is a top view of an electric pressure cooker according to an embodiment of the present invention.

As shown in FIGS. 1 to 3, the electric pressure cooker 100 according to embodiments includes a cooker body 1, a cooker cover 2 and a micro-switch assembly 3.

The cooker cover 2 has a closing state in which the cooker body 1 is covered by the cooker cover 2 and an opening state in which the cooker cover 1 is removed from the cooker body 3. In the closing state, the cooker cover 2 is rotatable with respect to the cooker body 1 between a sealing position and an unsealing position, i.e., when the cooker cover 2 initially covers the cooker body 1, the cooker cover 2 is in the unsealing state, and the cooker cover 2 can be rotated with respect to the cooker body 1 in one direction, for example in a clockwise direction, to the sealing state so that the cooker cover 2 is locked and sealed with the cooker body 1. On the other hand, when being in the sealing state, the cooker cover 2 can be rotated with respect to the cooker body 1 in another direction, for example in the counterclockwise direction, to the unsealing state, so that the cooker cover 2 can be removed from the cooker body 1.

For locking the cooker cover 2 with the cooker body 1 in the sealing state, a cooker tooth can be disposed on the cooker cover 2, correspondingly, a flanging can be disposed on the cooker body 1, when the cooker cover 2 covers the cooker body 1 and is rotated with respect to the cooker body 1 in the clockwise direction, the cooker tooth can be engaged with the flanging, such that the cooker cover 2 can be locked in the sealing state to ensure the sealing between the cooker cover 2 and the cooker body 1.

As shown in FIG. 1, the micro-switch assembly 3 is disposed on the cooker body 1 and is adapted to switch between an OFF state in which the micro-switch assembly 3 controls the electric pressure cooker 100 not to cook and an ON state in which the micro-switch assembly 3 controls the electric pressure cooker 100 to cook. When the cooker cover 2 is in the closing state and at the unsealing position, the cooker cover 2 actuates the micro-switch assembly 3 to switch to the OFF state, and when the cooker cover 2 is in the opening state or in the closing state and at the sealing position, the micro-switch assembly 3 is in the ON state.

More particularly, when the micro-switch assembly 3 controls the electric pressure cooker 100 not to cook, the micro-switch assembly 3 electrically disconnects the electric pressure cooker 100 from an external power source, or merely electrically disconnects the connection between a heating disc of the electric pressure cooker 100 and the external power source, but still maintains the electrical connection between other unit and the external power source, such like a display control panel. Thus, the user can still control the operation of the electric pressure cooker 100 and read the state information via the display control panel when the electric pressure cooker 100 is not operated to cook.

Figure 6:
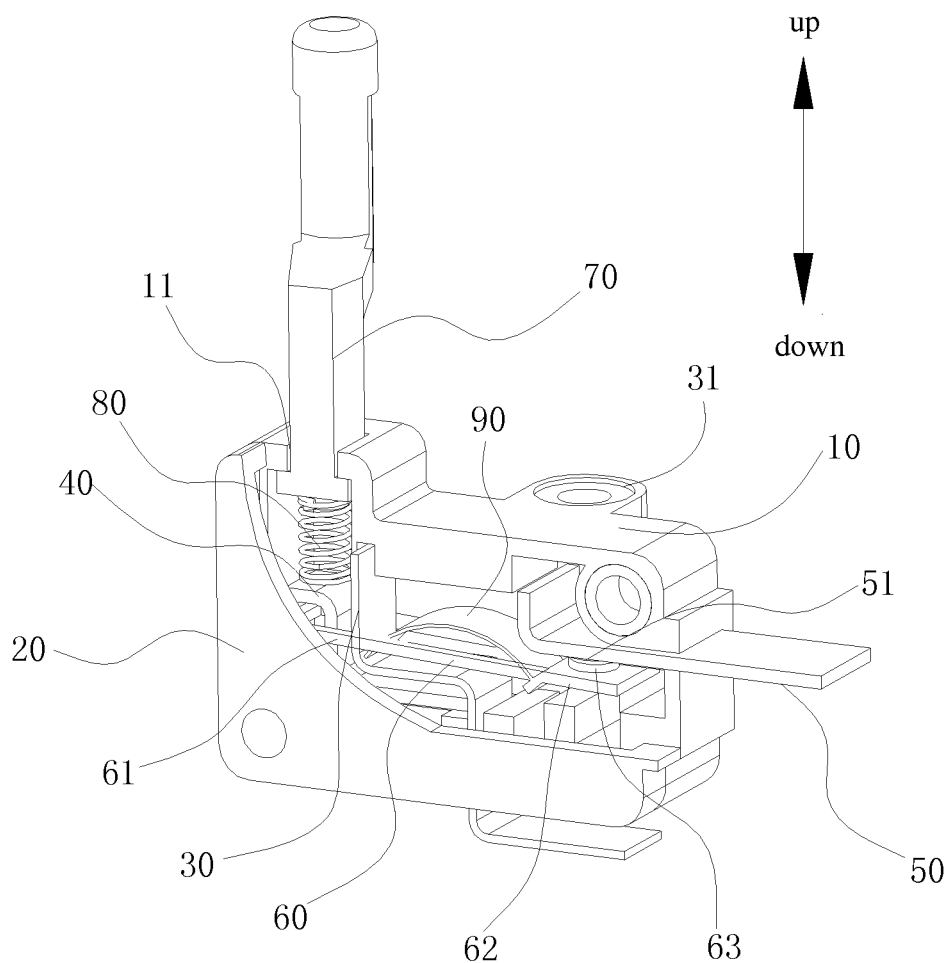
FIG. 6 is a schematic view of a micro-switch assembly of an electric pressure cooker according to a first embodiment of the present invention.

As shown in FIG. 6, the micro-switch assembly is disposed in the cooker body 1 and has a push rod 70. The push rod 70 is movable in an up-down direction between a first position at which the micro-switch assembly 3 is in the ON state and a second position at which the micro-switch assembly 3 is in the OFF state. When the cooker cover 2 is in the closing state and at the unsealing position, the cooker cover 2 actuates the push rod 70 to the second position; when the cooker cover 2 is in the opening state or in the closing state and at the sealing position, the cooker cover 2 releases the push rod 70 to the first position.

The cooker cover 2 can be contacted with the push rod 70 so as to drive the push rod 70 to move in the direction of up-down between the first position and the second position.

In particular, when the push rod 70 is at the second position, i.e., the push rod 70 is pushed and downwardly by the cooker cover 2, the electric pressure cooker 100 is disconnected from the external power source, i.e., the electric pressure cooker 100 is not electrified.

When the push rod 70 is at the first position, i.e., the push rod 70 can be moved upwardly without being pushed by the cooker cover 2, the electric pressure cooker 100 is electrically connected with the external power source, and then the electric pressure cooker 100 can be operated to cook. It should be noted that, herein "the push rod 70 is not pushed by the cooker cover 2" includes two conditions. A first one is that the cooker cover 2 is removed from the cooker body 1, and a second one is that the cooker cover 2 covers the cooker body 1 without pushing the push rod 70 downwardly.

When the electric pressure cooker 100 is open, i.e., the cooker cover 2 is removed from the cooker body 1, the push rod 70 is at the first position, and then the electric pressure cooker 100 is electrically connected with the external power source, such that the electric pressure cooker 100 can be operated to cook without being covered by the cooking cover 2, thus resulting in expending the applications of the electric pressure cooker 100.

The micro-switch assembly 3 may be a normally open switch, i.e., the push rod 70 moves upwardly to the first position without being driven by external forces, such that the micro-switch can be kept in the ON state normally.

With the micro-switch assembly 3, the electric pressure cooker 100 according to embodiments of the present invention can cook food without being covered by the cooker cover 2, i.e., the cooker cover 2 is in the opening state, thus achieving the function of cooking food without the covered cooker cover 100 and expending the applications of the electric pressure cooker 100 greatly.

According to an embodiment of the present invention, as shown in FIG. 1, the cooker body 1 includes: a housing 12, an outer container 13 and a cap 14.

The outer container 13 is disposed in the housing 12 and is configured to receive an inner container (not shown).

A cavity is defined between the outer container 13 and the housing 12, and the cap 14 is fitted over upper portions of the outer container 13 and the housing 12 and closes the cavity. The micro-switch assembly 3 is disposed in the cavity and the push rod 70 is extended upwardly out of the cap 14, such that the cavity is prevented from water, dust or others entering to affect the operation of the micro-switch assembly 3, thus improving safety and working life of the electric pressure cooker 100.

Figure 5:
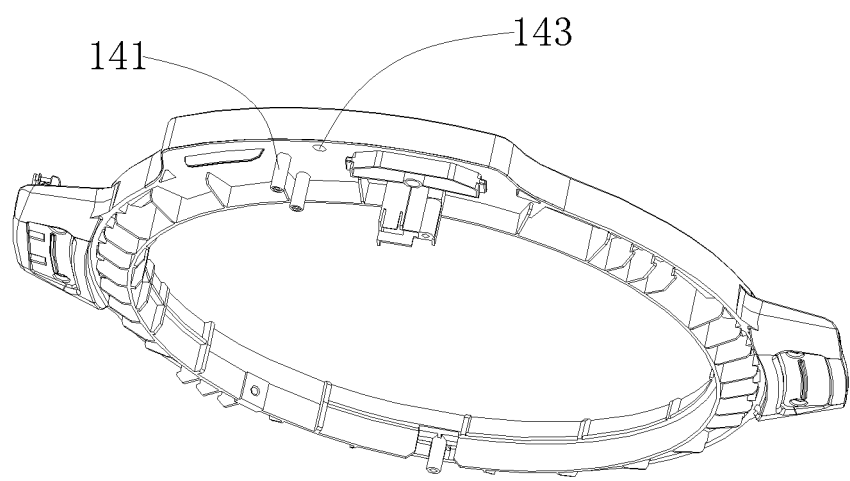
FIG. 5 is a schematic view of a cap of an electric pressure cooker according to an embodiment of the present invention.

An upper end of the push rod 70 is extended upwardly through the cap 14 so as to contact with the cooker cover 2. It can be understood that the cap 14 may have a structure which allows the push rod 70 to pass through. For example, as shown in FIG. 5, a through-hole 143 corresponding with an upper portion of the push rod 70 is formed in the cap 14.

Figure 4:
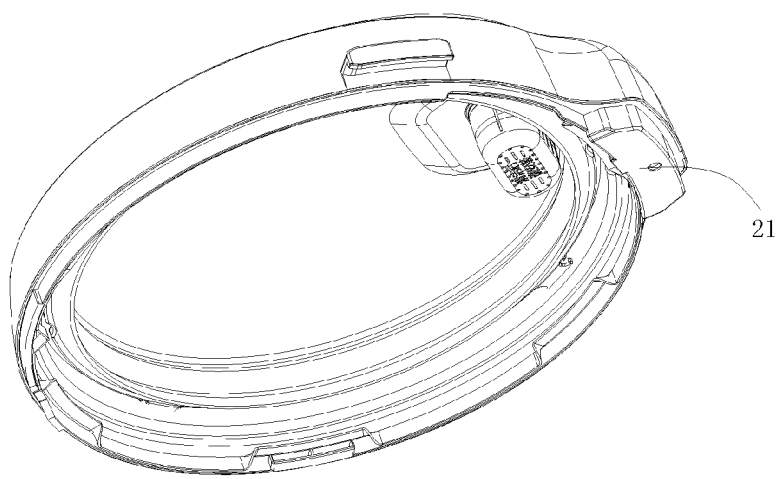
FIG. 4 is a schematic view of a cooker cover of an electric pressure cooker according to an embodiment of the present invention.

As shown in FIG. 4, a boss 21 is disposed on a bottom surface of the cooker cover 2 and is adapted to actuate the push rod 70 to move. The boss 21 is extended downwardly from the bottom surface of the cooker cover 2. In this way, when the cooker cover 2 covers the cooker body 1 and is in the unsealing state, the boss 21 can contact with the push rod 70 and pushes the push rod 70 to the second position, such that the electric pressure cooker 100 is disconnected from the external power source, i.e., the electric pressure cooker 100 is not operated to cook.

When the cooker cover 2 is rotated to the sealing state, the boss 21 is rotated to separate from the push rod 70. Since the push rod 70 is not restricted by the boss 21 and the elastic forces of an elastic member (it will be described in the following) is applied on the push rod 70, the push rod 70 moves upwardly to the first position, and then the electric pressure cooker is electrified.

When the cooker cover 2 is in the opening state, similarly, since the push rod 70 is not blocked by the boss 21 and the elastic forces of an elastic member is applied on the push rod 70, the push rod 70 moves upwardly to the first position, and then the electric pressure cooker is electrified.

As shown in FIG. 6, the micro-switch assembly 3 has a first mounting hole 31. As shown in FIGS. 2 and 5, the cap 14 has a threaded stud 141 disposed on a bottom surface of the cap 14, and the threaded stud 141 is extended downwardly through the first mounting hole 31, such that the micro-switch assembly 3 can be secured to the threaded stud 141 via a fastener 142, such as a screw or a bolt.

The micro-switch assembly 3 will be described in details in the following with reference to FIGS. 6 to 13.

As shown in FIGS. 6 to 13, the micro-switch assembly according to embodiments of the present invention includes: a front housing 10, a rear housing 20, a fixed support 30, a movable support 40, a fixed piece 50, a movable piece 60 and an elastic member 80.

Specifically, the front housing 10 has a second mounting hole 11. Within, the push rod 70 is movably passed through the second mounting hole 11 in the up-down direction, and the rear housing 20 is coupled with the front housing 10. The fixed support 30 is mounted on the front housing 10, and the movable support 40 is movably connected with the fixed support 30 in the up-down direction. The fixed piece 50 is mounted on the front housing 10 and has a first contactor 51. The movable piece 60 has a first end 61 and a second end 62. The first end 61 is connected with the movable support 40 so that the movable piece 60 is movable between a contacting position and a separating position in the up-down direction along with the movable support 40, and the second end 62 is extended through the fixed support 30 to a position which is below the fixed piece 50 and has a second contactor 63. The first contactor 51 is contacted with the second contactor 63 in the contacting position, and the first contactor 51 is separated from the second contactor 63 in the separating position.

The push rod 70 is disposed within the second mounting hole 11, and a lower end of the push rod 70 is connected with the movable support 40. The elastic member 80 is disposed between push rod 70 and the movable support 40 and has a first end connected with the lower end of the push rod 70 and a second end connected with the movable support 40, so as to apply an upward force on the push rod 70 when the push rod 70 moves downwardly.

A spring piece 90 is mounted between the fixed support 30 and the second end 62 of the movable piece 60.

When the micro-switch assembly 3 is not pushed, the elastic member 80 is in a relaxed state, and the second contactor of the movable piece 60 contacts with the first contactor 51 of the fixed piece 50. When the push rod 70 moves downwardly due to pushing forces acted thereon, firstly, the push rod 70 presses the elastic member 80 and applies a certain force downwardly on the elastic member 80, and then the elastic member 80 transmits the forces to the movable support 40 and presses the movable support 40 to move downwardly, finally, the movable piece 60 is driven to move downwardly, such that the second contactor of the movable piece 60 is separated from the first contactor 51 of the fixed piece 50 and the micro-switch assembly 3 is operated to switch. At this time, the push rod 70 can move downwardly continuously until the elastic member 80 is compressed to the maximum displacement.

Therefore, with disposing the elastic member 80 having a certain buffer function between the push rod 70 and the movable support 40, after the push rod 70 presses the elastic member 80 until the micro-switch assembly 3 is operated to switch, the push rod 70 can move continuously, such that the push rod 70 can reach a larger displacement and has a larger movement space, thus increasing a use range of the micro-switch assembly 3.

Selections of the elastic member 80 do not have special restrictions, and technical means commonly used by those skilled in the art can be adopted. In an embodiment of the present invention, the elastic member 80 is a spring, since the spring has a simple structure, a good elasticity and a low cost.

Figure 7:
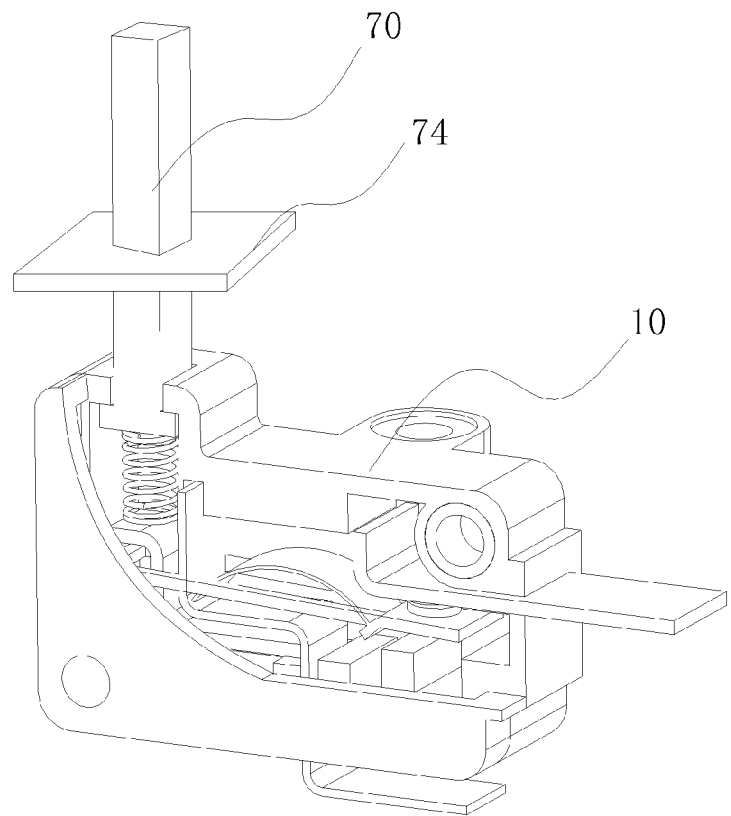
FIG. 7 is a schematic view of a micro-switch assembly of an electric pressure cooker according to a second embodiment of the present invention.
Figure 8:
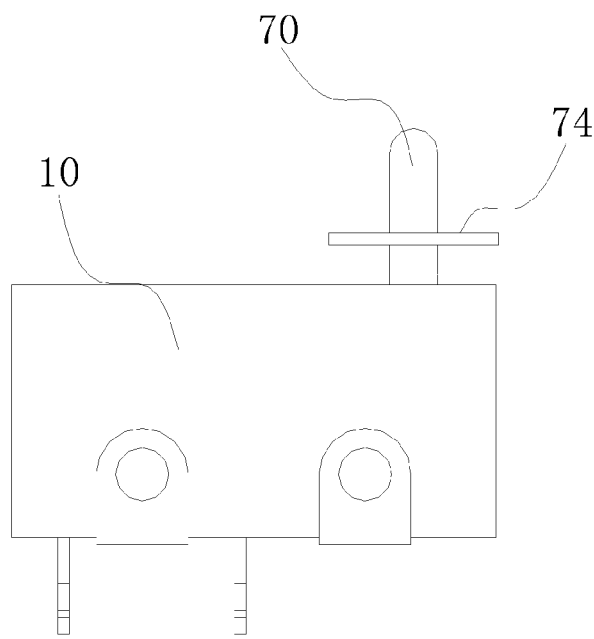
FIG. 8 is a side view of the micro-switch assembly in FIG. 7.

Considering that there is a lot of water vapors appeared in the operating environments of the micro-switch assembly 3, in order to prevent the water vapor from entering the micro-switch assembly 3 along the push rod 70, in an embodiment of the present invention as shown in FIGS. 7 and 8, the push rod 70 is configured as a column and has a water blocking flange 74 disposed on a peripheral surface of the push rod 70. An orthogonal projection area of the water blocking flange 74 on the front housing 10 is larger than a cross-sectional area of the second mounting hole 11. Thus, when water flows downwardly along the push rod 70, due to a blocking effect of the water blocking flange 74, the water cannot flow into the second mounting hole 11 along the peripheral surface of the push rod 70, thus ensuring the safety of the micro-switch assembly 3.

Specifically, a shape of the water blocking flange 74 does not have special restrictions, as long as a size of the water blocking flange 74 is larger than an opening size of the second mounting hole 11. In an embodiment of the present invention as shown in FIG. 7, the water blocking flange 74 is configured as a square plate.

Figure 9:
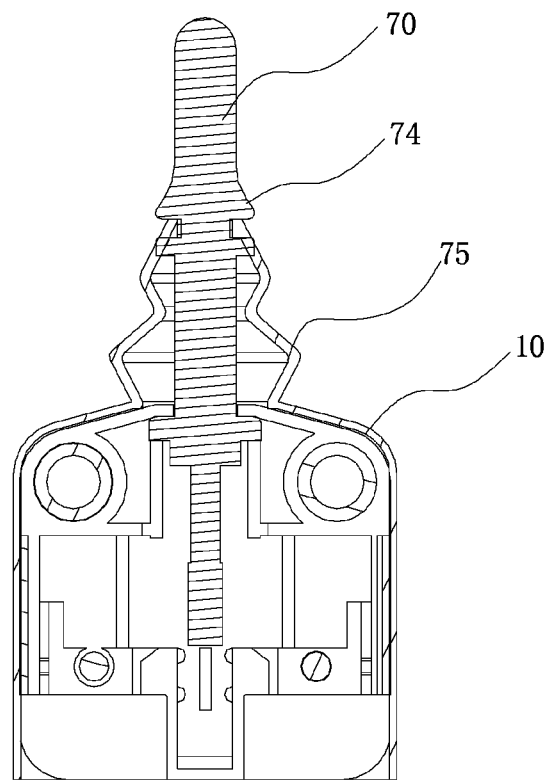
FIG. 9 is a schematic view of a micro-switch assembly of an electric pressure cooker according to a third embodiment of the present invention.

Furthermore, according to an embodiment of the present invention as shown in FIG. 9, the micro-switch assembly may further include a silicone sleeve 75. The silicone sleeve 75 is fitted over the push rod 70 and is located between the water blocking flange 74 and the second mounting hole 11, such that the water on the push rod 70 can flow across the silicone sleeve 75 to an upper surface of the front housing 10, instead of flowing into the second mounting hole 11. Moreover, the silicone sleeve 75 has a lower end pressed against the upper surface of the front housing 10, which seals a communication between the second mounting hole 11 and an external environment, thus preventing the water vapor or water flow from entering the micro-switch assembly 3 and further improving the safety of the micro-switch assembly 3.

It should be noted that, a shape or structure of the push rod 70 can be adjusted according to the working conditions of the micro-switch assembly 3. In an embodiment of the present invention as shown in FIGS. 10 to 13, the push rod 70 is non-straight, i.e., a rod with an abnormal shape or structure. Thus, a structure of the push rod 70 can be matched with a plurality of structures and be adapted to be used for various non-coaxial and non-coplanar assembly relationships, thus increasing the movement space of the micro-switch assembly 3 to some extent.

Figure 10:
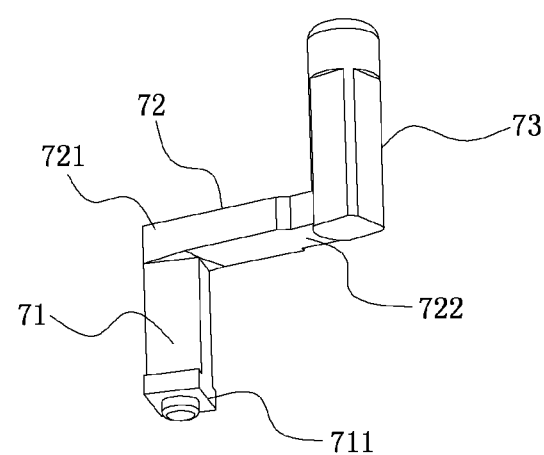
FIG. 10 is a schematic view of a push rod of a micro-switch assembly in FIG. 6.
Figure 11:
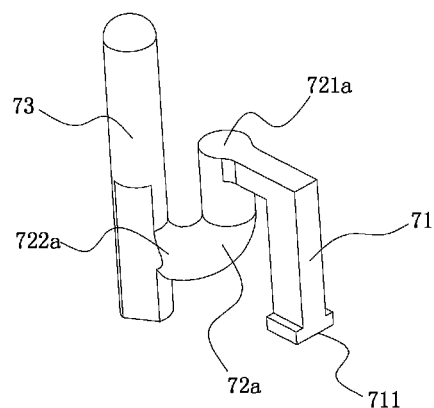
FIG. 11 is a schematic view of a push rod of a micro-switch assembly according to another embodiment of the present invention.

In an embodiment of the present invention as shown in FIGS. 10 and 11, the push rod 70 includes: a pushing part 71, a connecting part 72 and a water guiding part 73.

Specifically, the pushing part 71 is fitted within the second mounting hole 11 and has a lower end connected with the elastic member 80. The connecting part has a first end 721 and a second end 722. The first end 721 is connected with the pushing part 71 and the second end 722 is connected with the water guiding part 73, and an upper surface of the connecting part 72 is extended horizontally or extended obliquely and upwardly in a direction from the second end 722 of the connecting part 72 to the first end 721 of the connecting part 72. In other words, a height of an upper surface of the first end 721 of the connecting part 72 with respect to the pushing part 71 is higher than or equal to that of the second end 722 of the connecting part 72 with respect to the pushing part 71.

More particularly, the pushing part 71 and the water guiding part 73 are disposed apart from each other in a vertical direction (as shown the up-down direction in drawings), and the height of the upper surface of the second end 722 connected with the water guiding part 73 with respect to the pushing part 71 is less than or equal to that of the upper surface of the first end 721 connected with the pushing part 71 with respect to the pushing part 71, i.e., the height of the upper surface of the first end 721 in a horizontal direction is higher or equal to than that of the upper surface of the second end 722 in the horizontal direction. Thus, when the water flows along the push rod 70, and since the upper surface of the first end 721 of the connecting part 72 is higher than or flush with the upper surface of the second end 722 of the connecting part 72, the water passing across the water guiding part 73 cannot flow to the first end 721 of the connecting part 72 with the higher or equal height from the second end 722 of the connecting part 72 with the less height, such that the water are prevented from flowing into the micro-switch assembly 3 and the safety of the micro-switch assembly 3 is improved.

A shape of the connecting part has no special restrictions, as long as the above technical effects can be achieved. In an embodiment of the present invention as shown in FIG. 10, the connecting part 72 is straight and substantially perpendicular to the pushing part 71 and the water guiding part 73 respectively. Further, the second end 722 of the connecting part 72 is connected with a lower end of the water guiding part 73 and the first end 721 of the connecting part 72 is connected with an upper end of the pushing part 71. Thus, the connecting part 72 has a simple structure and a low cost.

In an embodiment of the present invention as shown in FIG. 11, the connecting part 72 includes an arc segment and a straight segment, and the pushing part 71 has a L-shape. The second end 722a of the connecting part 72a is connected with the water guiding part 73, and the first end 721a of the connecting part 72a is connected with the pushing part 71. Preferably, an upper end of the water guiding part 73 is higher than the upper end of the pushing part 71, and the lower end of the water guiding part 73 is flush with a lower end of the pushing part 71. Furthermore, the first end 721a of the connecting part 72a is higher than the second end 722a of the connecting part 72a. Thus, the connecting part 73 can guide the water on the water guiding part 73 to the lower end of the water guiding part 73 better, thus ensuring a waterproof effect of the micro-switch assembly 3.

Considering the manufacture cost, in an embodiment of the present invention, the pushing part 71, the connecting part 72 and the water guiding part 73 may be integrally formed. Thus, the integral structure not only ensures a stability of the whole structure of the pushing rod 70, but also reduces the manufacturing difficulty and controls the manufacture cost.

Figure 12:
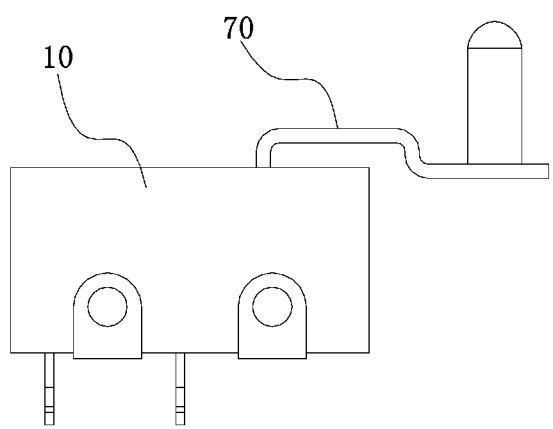
FIG. 12 is a schematic view of a micro-switch assembly according to a fourth embodiment of the present invention.
Figure 13:
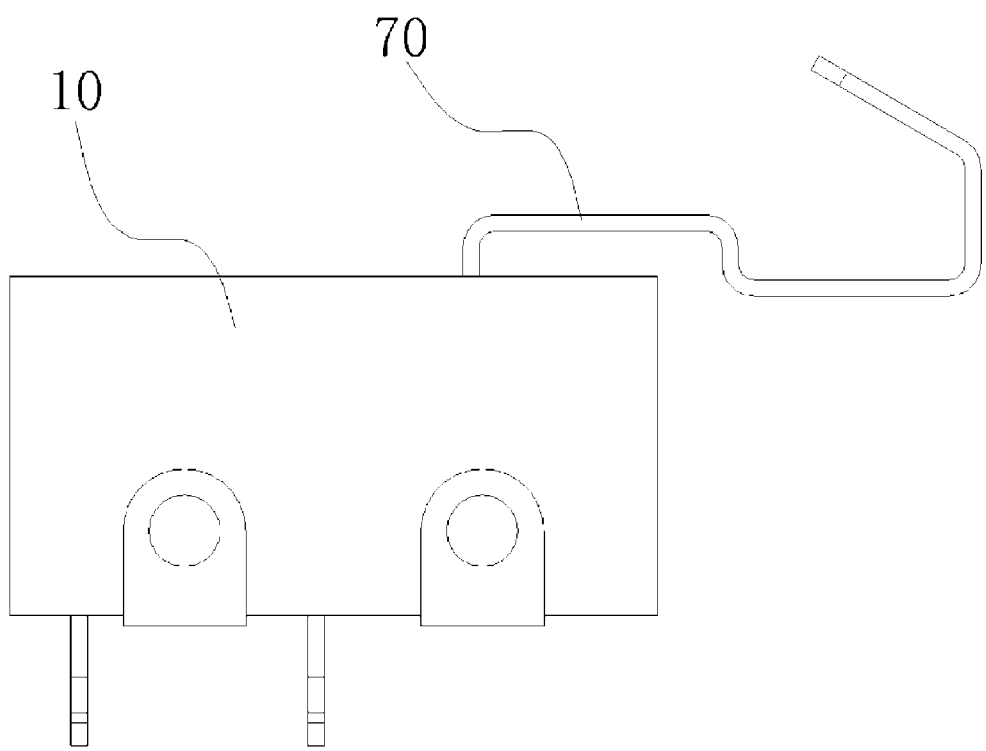
FIG. 13 is schematic view of a micro-switch assembly according to a fifth embodiment of the present invention.

Other non-straight rods of the micro-switch assembly according to embodiments of the present invention also are shown in FIGS. 12 and 13, the micro-switch assembly 3 therein can be adapted with a plurality of other structures, thus extending an application scope of the micro-switch assembly 3 and achieving a waterproof function as well.

With disposing the micro-switch assembly 3 which can be pushed by the pushing rod 70 to switch between the On state and Off state, the electric pressure cooker according to embodiments of the present invention can achieve the function of cooking food without being covered by the cooker cover 2. Moreover, with the non-straight rod 70 and the water blocking flange 74, the water on the cap 14 can be prevented from entering the micro-switch assembly 3, such that the safety of the whole electric pressure cooker 100 is improved and the applications of the electric pressure cooker 100 also is improved greatly.

It can be understood that operational principles and operation process of other structures such as a heater and an air discharge valve of the electric pressure cooker 100 according to embodiments of the present invention, which are omitted here, are known in the art.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. An electric pressure cooker, comprising:
   a cooker body, wherein the cooker body comprises:
      a housing;
      an outer container disposed in the housing such that a cavity is defined between the outer container and the housing; and
      a cap fitted over upper portions of the outer container and the housing and closing the cavity;
   a cooker cover having a closing state in which the cooker body is covered by the cooker cover and an opening state in which the cooker cover is removed from the cooker body, wherein the cooker cover is rotatable with respect to the cooker body between a sealing position and an unsealing position in the closing state; and
   a micro-switch assembly disposed on the cooker body and adapted to switch between an OFF state in which the micro-switch assembly controls the electric pressure cooker not to cook and an ON state in which the micro-switch assembly controls the electric pressure cooker to cook, wherein when the cooker cover is in the closing state and at the unsealing position, the cooker cover actuates the micro-switch assembly to switch to the OFF state, and wherein the micro-switch assembly is in the ON state when the cooker cover is in the opening state or at the sealing position;
   wherein the micro-switch assembly comprises:
      a push rod movable in an up-down direction between a first position at which the micro-switch assembly is in the ON state and a second position at which the micro-switch assembly is in the OFF state, wherein the cooker cover actuates the push rod to the second position when the cooker cover is in the closing state and at the unsealing position;
      a front housing having a second mounting hole within which the push rod is movably disposed in the up-down direction;

a rear housing coupled with the front housing;
a fixed support disposed on the front housing; and
a movable support movably coupled with the fixed support in the up-down direction;
wherein the micro-switch assembly is disposed in the cavity and the push rod extends upwardly out of the cap.

2. The electric pressure cooker according to claim 1, wherein a boss is disposed on a bottom surface of the cooker cover and is adapted to actuate the push rod to move.

3. The electric pressure cooker according to claim 1, wherein the micro-switch assembly has a first mounting hole, and the cap has a threaded stud disposed on a bottom surface of the cap and extended downwardly through the first mounting hole, wherein the micro-switch assembly is secured to the threaded stud via a fastener fitted with the threaded stud.

4. The electric pressure cooker according to claim 1, wherein the micro-switch assembly further comprises:
a fixed piece disposed on the front housing and has a first contactor;
a movable piece defining a first end and a second end, the first end being connected with the movable support so that the movable piece is movable between a contacting position and a separating position in the up-down direction along with the movable support, and the second end being extended through the fixed support to a position bellow the fixed piece and has a second contactor, wherein the first contactor is contacted with the second contactor in the contacting position, and the first contactor is separated from the second contactor in the separating position; and
an elastic member disposed between the push rod and the movable support and configured to apply an upward force on the push rod when the push rod moves downwardly.

5. The electric pressure cooker according to claim 1, wherein the push rod is configured as a column and has a water blocking flange disposed on a peripheral surface of the push rod, an orthogonal projection area of the water blocking flange on the front housing is larger than a cross-sectional area of the second mounting hole.

6. The electric pressure cooker according to claim 5, wherein the water blocking flange is configured as a square plate.

7. The electric pressure cooker according to claim 5, wherein the micro-switch assembly further comprises: a silicone sleeve fitted over the push rod and located between the water blocking flange and the second mounting hole, and the silicone sleeve has a lower end pressed against an upper surface of the front housing.

8. The electric pressure cooker according to claim 7, wherein the push rod is non-straight.

9. The electric pressure cooker according to claim 8, wherein the push rod comprises:
a pushing part fitted within the second mounting hole;
a water guiding part;
a connecting part defining a first end connected with the pushing part and a second end connected with the water guiding part, and an upper surface of the connecting part is extended horizontally or extended obliquely and upwardly in a direction from the second end of the connecting part to the first end of the connecting part.

10. The electric pressure cooker according to claim 9, wherein the connecting part is straight and is substantially perpendicular to the pushing part and the water guiding part respectively.

11. The electric pressure cooker according to claim 9, wherein the second end of the connecting part is connected with a lower end of the water guiding part and the first end of the connecting part is connected with an upper end of the pushing part.

12. The electric pressure cooker according to claim 8, wherein the push rod comprises:
a pushing part fitted within the second mounting hole;
a water guiding part;
a connecting part defining a first end connected with the pushing part and a second end connected with the water guiding part,
wherein the connecting part comprises an arc segment and a straight segment, and the pushing part has a L-shape, the arc segment is connected with the water guiding part and the straight segment is connected with the pushing part.

13. The electric pressure cooker according to claim 12, wherein an upper end of the water guiding part is higher than the upper end of the pushing part, and the lower end of the water guiding part is flush with a lower end of the pushing part.

14. The electric pressure cooker according to claim 12, wherein the first end of the connecting part is higher than the second end of the connecting part.

15. The electric pressure member according to claim 14, wherein the pushing part, the connecting part and the water guiding part are integrally formed.

\* \* \* \* \*